United States Patent

Tseng

[11] Patent Number: 5,694,907
[45] Date of Patent: Dec. 9, 1997

[54] GASOLINE ENGINE BOOSTER

[76] Inventor: Wen-Chih Tseng, P.O. Box 2103, Taichung City, Taiwan

[21] Appl. No.: 534,173

[22] Filed: Sep. 26, 1995

[51] Int. Cl.$^6$ .................................................. F02M 23/00
[52] U.S. Cl. .................................................. 123/587
[58] Field of Search ...................... 123/585, 587

[56] References Cited

U.S. PATENT DOCUMENTS

| | | | |
|---|---|---|---|
| 2,876,757 | 3/1959 | Korienek | 123/587 |
| 3,463,132 | 8/1969 | Krieck | 123/587 |
| 4,344,406 | 8/1982 | Minor et al. | 123/587 |
| 4,345,574 | 8/1982 | Iwami | 123/587 |
| 4,370,971 | 2/1983 | Bush | 123/587 |
| 5,245,976 | 9/1993 | Faull | 123/587 |
| 5,313,926 | 5/1994 | Lin | 123/587 |

Primary Examiner—David A. Okonsky

[57] ABSTRACT

A gasoline engine booster which includes a casing having a first port connected to the atmosphere, a second port connected to the intake manifold, a first air passage of smaller diameter and a second air passage of bigger diameter connected in series between the first port and the second port, an adjusting device longitudinally movably fastened to the inside of the second air passage to hold a spring, a steel ball supported on the spring and forced by it to stop the connection between the first air passage and the second air passage, and a tightening up screw threaded into a screw hole on the casing to hold down the adjusting device, whereby when the pressure in the intake manifold drops below a predetermined value, outside air is induced into the first air passage to force the steel ball away from the first air passage, so that outside air flows through the second air passage into the intake manifold of the gasoline engine to mix with fuel oil for complete combustion.

5 Claims, 2 Drawing Sheets

GASOLINE ENGINE BOOSTER

BACKGROUND OF THE INVENTION

The present invention relates to gasoline engine boosters, and relates more particularly to such a gasoline engine booster which provides more air to the gasoline engine to improve complete combustion of gasoline, without affecting the normal operation of the vacuum brake pump.

FIG. 1 shows an economizer for gasoline engines according to the prior art. This economizer comprises a base 91, an air purifier 92, an air valve 93, a check valve 94, and air intake pipes 95 and 96. Intake air is heated at the base 91, then guided through the air valve 93 and the check valve 94 into the intake manifold 98 or carburetor of the gasoline engine 97 for further mixing with gasoline for complete combustion. The check valve 94 prohibits reverse flow of intake air. However, this structure of economizer is still not satisfactory in function. Actually, increasing the intake volume of air greatly improves complete combustion of the gasoline engine, and therefore the gasoline engine produces more energy and pressure, and gives a higher output of horsepower. The aforesaid check valve is installed to prohibit reverse flow of intake air. However, after the intake stroke, the intake valves of the gasoline engine are closed, and the pressure in the intake manifold is lower than the atmospheric pressure, therefore no reverse flow of intake air will occur, i.e., the installation of the aforesaid check valve simply complicates the structure and cost of the economizer. Furthermore, the installation of the aforesaid air valve affects the normal operation of the motor vehicle. Because the intake flow of air which passes through the air valve is induced by a vacuum which is produced upon the movement of the piston during the intake stroke of the gasoline engine, it affects the pressure at the input port of the vacuum brake pump of the motor vehicle. The air valve 93 can only control the flow rate of air, it does not control the pressure of the intake flow of air. Therefore, the operation of the air valve 93 affects the performance of the vacuum brake pump of the motor vehicle.

SUMMARY OF THE INVENTION

It is the major object of the present invention to provide a gasoline engine booster which greatly improve the performance of the gasoline engine without affecting the operation of the vacuum brake pump of the motor vehicle. According to one embodiment of the present invention, the gasoline engine booster comprises a casing having a first port connected to the atmosphere, a second port connected to the intake manifold, a first air passage of smaller diameter and a second air passage of bigger diameter connected in series between the first port and the second port, an adjusting device longitudinally movably fastened to the inside of the second air passage to hold a spring, a steel ball supported on the spring and forced by it to stop the connection between the first air passage and the second air passage, and a tightening up screw threaded into a screw hole on the casing to hold down the adjusting device, whereby when the pressure in the intake manifold drops below a predetermined value, outside air is induced into the first air passage to force the steel ball away from the first air passage, so that outside air flows through the second air passage into the intake manifold of the gasoline engine to mix with fuel oil for complete combustion.

DETAILED DESCRIPTION OF THE PREFERRED EMBODIMENTS

Figure 1:
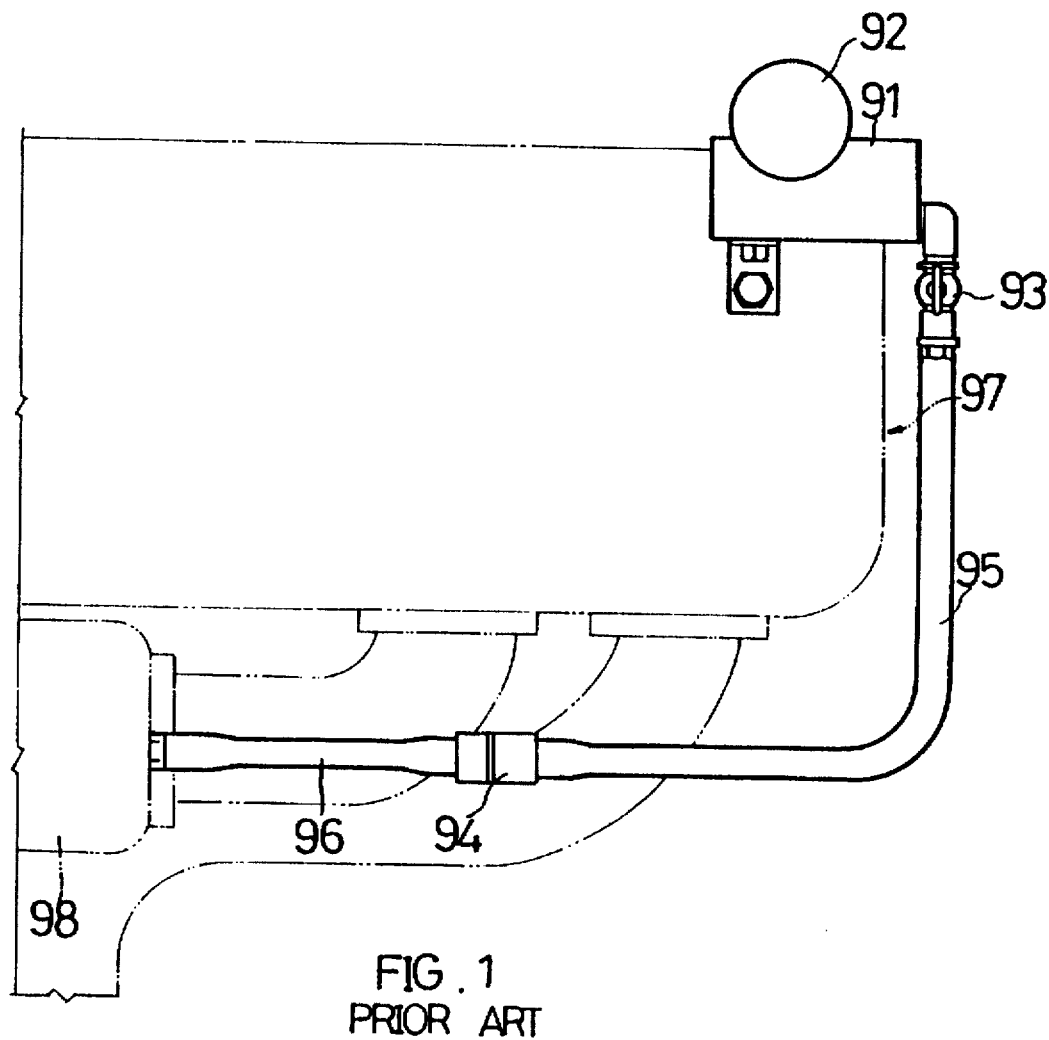
FIG. 1 shows an economizer installed in a gasoline engine according to the prior art.
Figure 2:
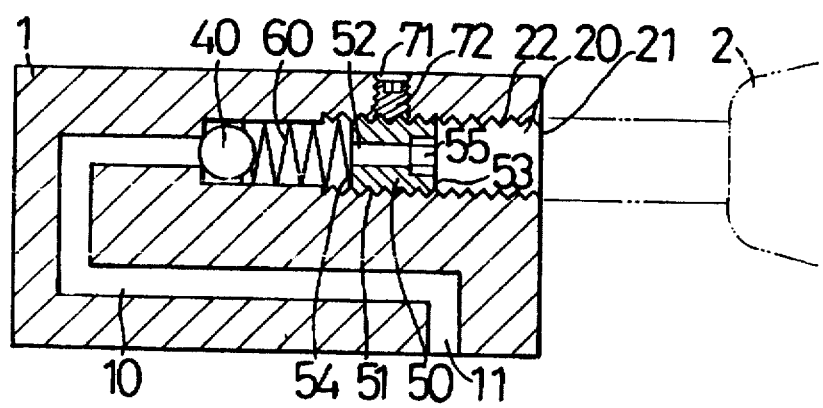
FIG. 2 is a sectional view of a gasoline engine booster according to the present invention.
Figure 3:
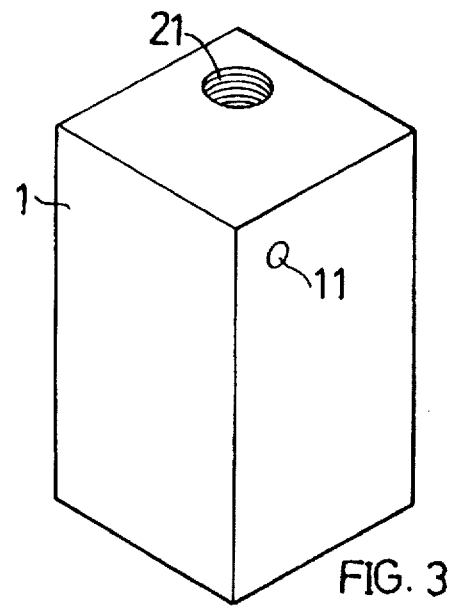
FIG. 3 is an elevational view of the gasoline engine booster shown in FIG. 2.

Referring to FIGS. 2 and 3, a gasoline engine booster in accordance with the present invention is generally comprised of a rectangular casing 1 having a first port 11 and a second port 21. The first port 11 receives air from the atmosphere. The second port 21 is connected to the intake manifold 2. A first air passage 10 and a second air passage 20 are defined within the casing 1. The first air passage 10 is connected between the first port 11 and the second air passage 20. The second air passage 20 is connected between the second port 21 and the first air passage 10. The inner diameter of the second air passage 20 is bigger than that of the first air passage 10. An inner thread 22 is made around the inside wall of the second air passage. The first air passage 10 and the second air passage 20 are linked into a substantially U-shaped airway. Alternatively, the first air passage 10 and the second air passage 20 may be longitudinally connected in a line (see FIG. 5). A steel ball 40 which is used as a check valve is mounted inside the second air passage 20 and disposed adjacent to the first air passage 10. The diameter of the steel ball 40 is bigger than that of the first air passage 10, but smaller than that of the second air passage. A cylindrical adjusting device 50 is mounted inside the second air passage 20, having an outer thread 51 threaded into the inner thread 22, and a longitudinal center air hole 52 extended to two opposite ends 53 and 54 thereof. One end 53 of the adjusting device 50 is disposed adjacent to the second port 21 of the casing 1, having a hexagonal recess 55 for turning by a hexagonal socket wrench or the like. A spring 60 is mounted inside the second air passage 20 and stopped between the adjusting device 50 and the steel ball 40. A screw hole 71 is made on the casing 1, and perpendicularly connected to the second air passage 20. A tightening-up screw 72 is threaded into the screw hole 71 to hold down the adjusting device 50.

When the engine is started to reciprocate the piston, the pressure in the intake manifold 2 is reduced. As the pressure in the intake manifold 2 drops below a predetermined value, outside air is induced into the first air passage 10 through the first port 11 to force the steel ball 44 away from the first air passage 10 toward the adjusting device 50, therefore the flow of air continuously flow through the second air passage 20 and the second port 21 into the intake manifold 2.

When the accelerator pedal is depressed, more fuel oil is guided into the intake manifold 2 to increase the concentration of the fuel mixture, therefore the combustion chamber produces more energy and more pressure. At the same time, the reciprocating speed of the piston is relatively increased (the vacuum power is relatively increased), thereby causing the pressure in the intake manifold reduced. If the supply of air is not relatively increased, incomplete combustion will occur, and more carbon monoxide and carbon compound will be produced and released into the air through the exhauster. However, the installation of the present invention eliminates the occurrence of this problem.

When the pressure in the intake manifold 2 drops below a predetermined value, the gasoline engine booster of the present invention allows outside air to pass from the first air passage 10 through the second air passage 20 to the intake manifold 2 for mixing with fuel oil for complete combustion. The adjusting device 50 can be turned inwards or outwards by a hexagonal socket wrench or the like to adjusted the set pressure.

Figure 4:
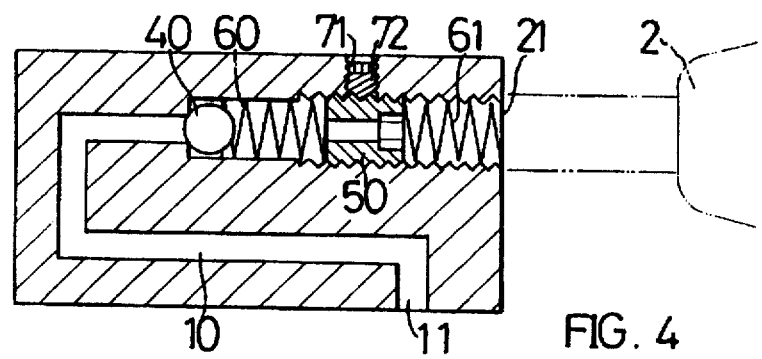
FIG. 4 is a sectional view of an alternate form of the gasoline engine booster according to the present invention.

FIG. 4 shows an alternate form of the present invention, in which a second spring 61 is mounted inside the second air passage 20 and stopped between the adjusting device 50 and the second port 21. The second spring 61 supports the adjusting device 50, and absorb shocks from the adjusting device 50.

Figure 5:
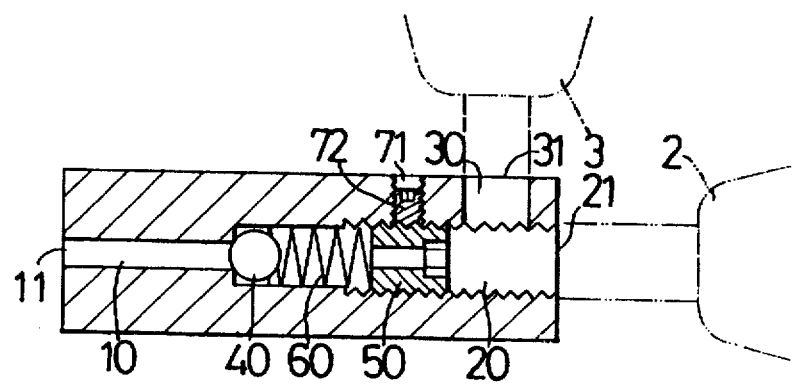
FIG. 5 is a sectional view of another alternate form of the gasoline engine booster according to the present invention.

FIG. 5 shows another alternate form of the present invention, in which the casing 1 has a third port 31 connected to the intake manifold 3, and a third air passage 30 connected between the third port 31 and the second air passage 20.

It is to be understood that the drawings are designed for purposes of illustration only, and are not intended as a definition of the limits and scope of the invention disclosed.

I claim:

1. A gasoline engine booster comprising:

a rectangular casing having a first port connected to the atmosphere, a second port connected to the intake manifold of the gasoline engine of a motor vehicle, a first air passage having a first end connected to said first port and a second end, a second air passage having a first end connected to the second end of said first air passage and a second end connected to said second port, a screw hole connected to said second air passage, the diameter of said second air passage being bigger than that of said first air passage, said second air passage having an inner thread;

an adjusting device mounted inside said second air passage, and turned inwards toward said first air passage or backwards toward said second port, said adjusting device having an outer thread threaded into the inner thread of said second air passage, a longitudinal center air hole in communication between said first air passage and said second port, and a hexagonal recess at one end adjacent to said second port for turning by a tool;

a steel ball mounted inside said second air passage adjacent to said first air passage, the diameter of said steel ball being bigger than that of said first air passage but smaller than that of said second air passage;

spring means mounted inside said second air passage and stopped between said steel ball and said adjusting device to force said steel ball into engagement with one end of said first air passage; and a tightening up screw threaded into the screw hole of said casing to hold down said adjusting device;

whereby when the pressure in the intake manifold of the gasoline engine drops below a predetermined value, outside air is induced into said first air passage to force said steel ball away from said first air passage, so that outside air flows through said second air passage into the intake manifold of the gasoline engine to mix with fuel oil for complete combustion.

2. The gasoline engine booster of claim 1 further comprising second spring means mounted inside said second air passage and stopped between said adjusting device and said second port.

3. The gasoline engine booster of claim 1 wherein said first air passage and said second air passage are connected into a U-shaped air way.

4. The gasoline engine booster of claim 1 wherein said first air passage and said second air passage are connected into a line.

5. The gasoline engine booster of claim 1 wherein said casing further comprises a third port connected to the vacuum brake pump of the motor vehicle, and a third air passage connected between said third port and said second air passage.

* * * * *